United States Patent [19]
Brock et al.

[11] Patent Number: 5,129,865
[45] Date of Patent: Jul. 14, 1992

[54] SPHERICAL TOOTH PULLEY

[75] Inventors: Thomas J. Brock, Amherst; Sean M. Philbin, East Longmeadow, both of Mass.

[73] Assignee: Belt Technologies, Inc., Agawam, Mass.

[21] Appl. No.: 682,378

[22] Filed: Apr. 9, 1991

[51] Int. Cl.⁵ .............................. F16H 55/30
[52] U.S. Cl. ...................................... 474/152
[58] Field of Search ............... 474/152–154, 474/202–205; 198/834

[56] References Cited

U.S. PATENT DOCUMENTS

| | | | |
|---|---|---|---|
| 2,207,330 | 7/1940 | Osburn | 474/154 |
| 2,408,666 | 10/1946 | Mallard | 474/153 |
| 2,724,974 | 11/1955 | Ayres | 474/153 |
| 3,642,120 | 2/1972 | Duhan | 474/153 |
| 3,772,930 | 11/1973 | Lamport | 474/153 |
| 4,568,320 | 2/1986 | Tangorra | 474/152 |

FOREIGN PATENT DOCUMENTS

| | | | |
|---|---|---|---|
| 303353 | 12/1989 | Japan | 474/153 |
| 8601570 | 3/1986 | World Int. Prop. O. | 474/153 |

Primary Examiner—Renee S. Luebke
Assistant Examiner—F. Saether
Attorney, Agent, or Firm—Ross, Ross & Flavin

[57] ABSTRACT

In an annular pulley for driving a belt having a series of spaced openings therein, the improvement comprising, a series of circumferentially-spaced annular openings in the pulley periphery, a series of spherical balls in the openings in the pulley periphery, the balls being retained in the openings only by a press fit and extending protusively outwardly from the pulley at spaced intervals therearound in defining a series of rounded teeth engageable in the spaced openings of the belt.

1 Claim, 4 Drawing Sheets

SPHERICAL TOOTH PULLEY

BACKGROUND OF THE INVENTION

1. Field Of The Invention

The invention relates to pulleys for driving belts and, more particularly, to such pulleys for the precision drive of thin belting.

2. Description Of The Prior Art

It is known in the prior art to use rotatable sprockets or toothed pulleys to engage with openings in an endless belt to drive the belt.

Alternatively, an endless toothed belt is driven by rotatable pulleys with the belt teeth engaging in appropriately spaced openings in the pulleys.

Such arrangements have been complicated in their structures, unreliable in their use, and expensive in their manufacture.

SUMMARY OF THE INVENTION

Herein is provided a pulley which is compatible with thin belting, is simple in its structure, inexpensive in its manufacture, and provides the advantages of a sprocket tooth or timing belt drive.

It is an objective hereof to improve the performance of a timed belt drive while at the same time reducing the cost of the pulleys needed for such a belt system.

Another object is to provide a softer, less expensive, more easily fabricated pulley body structure without deterring from the overall performance of the device.

The pulleys hereof may be used in innumerable applications, but essentially they are employed where positive, accurate, and repeatable translation of pulley rotary motion to belt linear motion or vice versa is required. Frequently these are indexing movements as in automated production lines where a continuous stream of product is indexed very accurately from one manufacturing operation to the next, until off-loaded at the end of the belt as a finished product. As a specific example, one of the last operations might be inspection wherein the product is positioned under a video camera which, through digitizing the features of the product, then compares those features (dimensions, number, etc.) with standards established for that product. Presently, this is done through computers; formerly, it might have been a comparison of a profile on an optical screen having a transparent drawing overlay.

Another broad area of application is where one wants to transmit the rotation of a motor to another shaft very accurately, as, for instance, a rotating mirror for a laser scanner. This can be done through gears, but if the mirror is remote from the motor—a belt works more effectively.

The pulleys hereof may be constructed from a variety of materials, i.e. thermoplastic, aluminum, steel, and the like, and into which hardened steel, ceramic or thermoplastic spherical balls are press-fit to act as rounded sprocket teeth for driving thin belting, such as metal, Mylar, Kapton or fiberglass belts. Alternatively, the pulleys may be constructed with integral hemi-spherical projections on their peripheries which act as rounded sprocket teeth for driving the belting.

The invention hereof provides a less expensive method of producing a precision drive with a hardened tooth in a structure which is widely adaptable to various belt drive requirements.

BRIEF DESCRIPTION OF THE PREFERRED EMBODIMENTS

Figure 1:
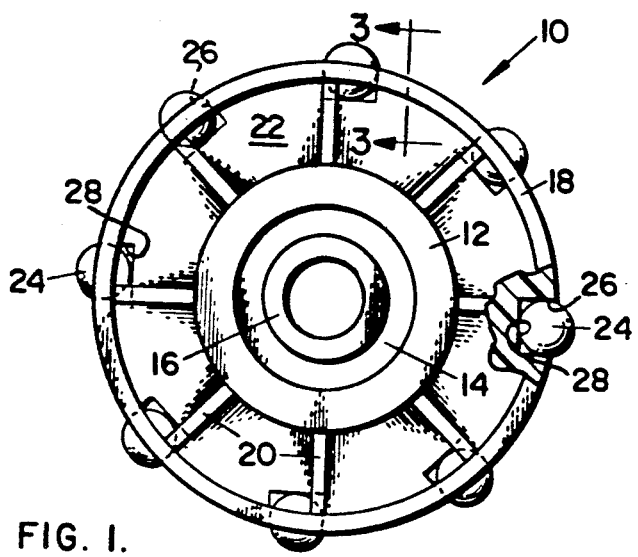
FIG. 1 is a front elevational view of a spherical tooth pulley embodying a preferred form of the invention.
Figure 2:
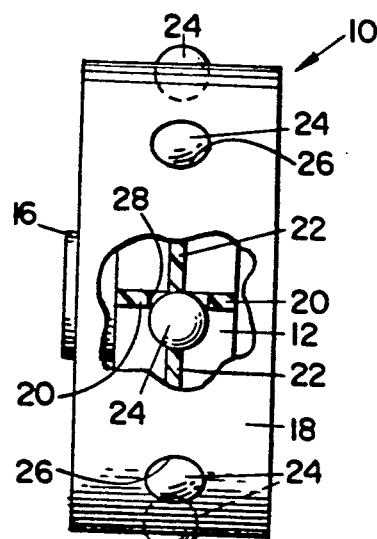
FIG. 2 is an end elevational view as seen from the right of FIG. 1.
Figures 3, 15:
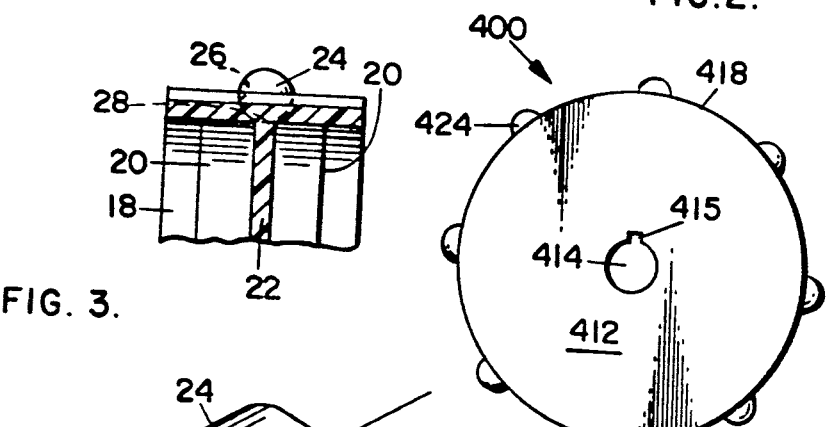
FIG. 3 is a cross-sectional view taken on line 3—3 of FIG. 1.
FIG. 15 is a front elevational view of a fifth modified form of pulley having integral hemi-spherical teeth.

Referring to FIGS. 1-3, a spherical tooth pulley 10 includes an inner ring-like hub 12 which surrounds a bearing ring 14 which carries a plurality of ball bearings, not shown, the bearing ring having an annular boss 16 extending outwardly from one side thereof for mounting the pulley on a drive shaft, not shown.

A ring-like outer peripheral wall 18 of the pulley is supported outwardly of hub 12 and in concentricity thereto by a plurality of spoke-like radially-arranged ribs 20 which extend between the hub and the outer peripheral wall.

Web-like wall segments 22 are disposed centrally of and extend between hub 12, outer peripheral wall 18 and adjacent pairs of ribs 20, the wall segments defining a continuous central wall providing additional support for outer peripheral wall 18 relative to hub 12.

Pulley 10 may be fabricated from a variety of materials, such as any metal of various hardness and alloy. These could include stainless steel, tool steel, aluminum, titanium and cast iron, any of which may be coated with other materials to change surface properties or characteristics.

Also, pulley 10 may be fabricated from thermoplastic such as glass filled NYLON, polypropylene or the like.

A plurality of spherical balls 24 are press fit into circumferentially-spaced annular openings 26 in outer peripheral wall 18.

Balls 24 may be fabricated from hardened steel, ceramic or thermoplastic such as ultra high molecular weight (UHMW) polypropylene or the like.

Each annular opening 26 communicates with a rectangular opening 28 formed in an adjacent portion of a wall segment 22 and an adjacent rib 20 disposed immediately therebelow.

By this arrangement, balls 24 are firmly and rigidly supported relative to pulley 10.

Figure 4:
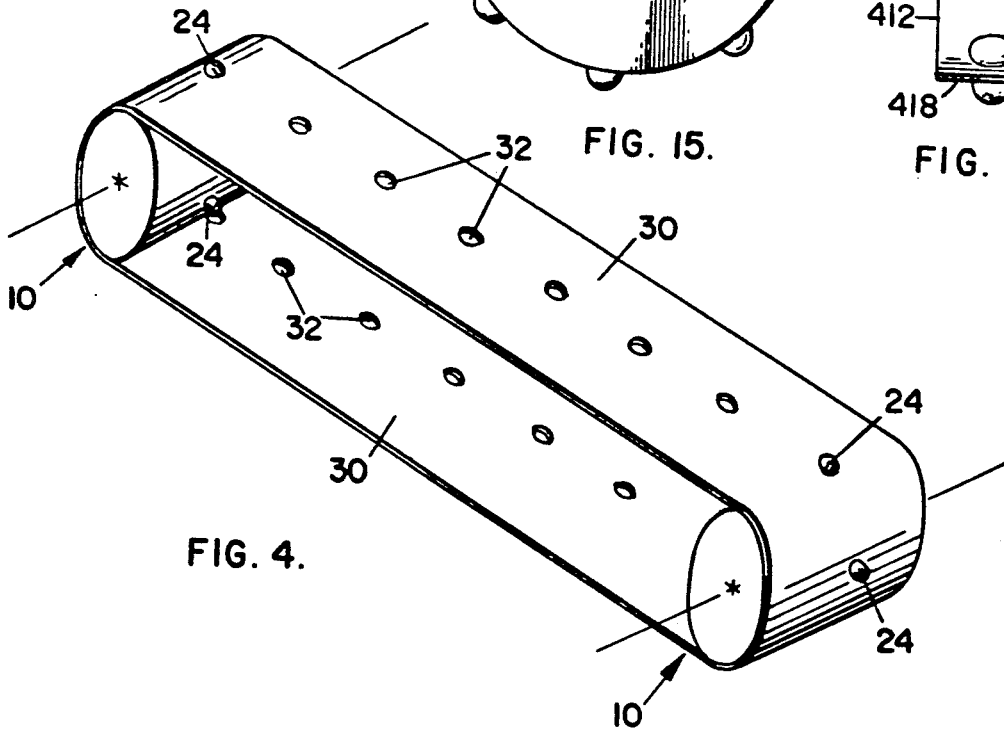
FIG. 4 is a perspective view of a pair of spherical tooth pulleys of the invention having a perforated belt entrained therearound.

As seen in FIG. 4, thin belting in the form of an endless belt 30 entrained about a pair of pulleys 10 has a series of spaced openings 32 therethrough on its central longitudinal axis of appropriate size and spacing so as to be engageable by the balls 24 on the pulleys which act in the manner of rounded teeth to drive the belt.

Of course, openings 32 in belt 30 may be positioned on other than the central longitudinal axis. For example, they may be disposed along a belt edge or otherwise disposed as appropriate to interface with balls 24 on pulleys 10.

The belting may be fabricated from metal, fiberglass or thermoplastic materials such as Mylar, Kapton, or the like.

Pulleys 10 are typically motor driven, and all types of motors are used, such as AC and DC, stepper motors, servo motors, constant speed motors, and the like, not shown.

As graphically illustrated in FIGS. 5-8, the dimensions of pulley 10 and balls 24 and their relative positions may be carefully tailored to meet various belt drive requirements, with the portion of each ball disposed outwardly of pulley outer peripheral wall 18 acting much in the manner of a rounded sprocket tooth for engagement in the openings 32 of belt 30.

Figure 5:
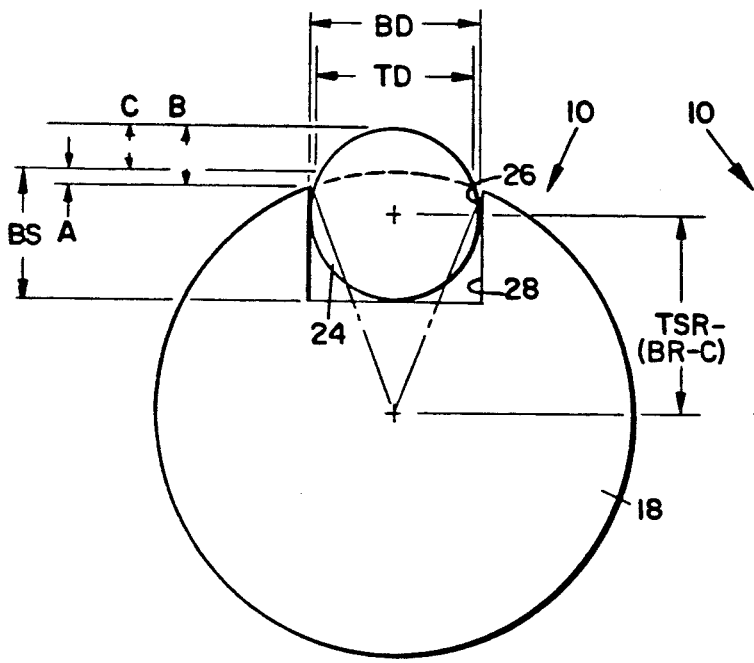
FIG. 5 is an enlarged graphic front elevational view showing the relationship of a single spherical tooth to the axis and peripheral surface of a pulley of the invention.
Figure 6:
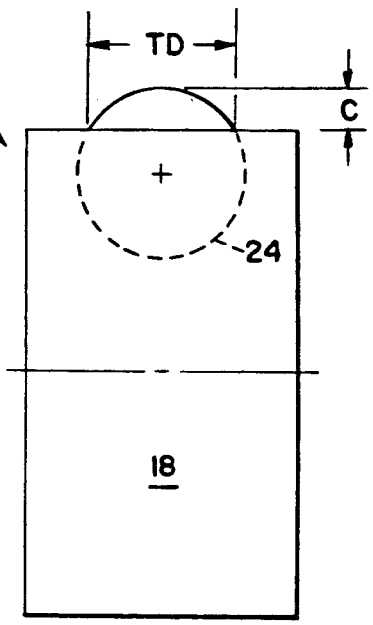
FIG. 6 is an end elevational view of the spherical tooth pulley of FIG. 5.

In FIGS. 5 and 6, the following legends identify ball and sprocket dimensions as follows:

BD = Ball Diameter
BR = Ball Radius
TD = Tooth Diameter
TSR = Tape or Belt Support Radius
BS = Ball Set
C = Tooth Height The following formulas may be used to compute several representative dimensions as follows:

$$A = TSR - \tfrac{1}{2}\sqrt{4(TSR^2) - BD^2}$$

$$B = BR - \tfrac{1}{2}\sqrt{4(BR^2) - TD^2}$$

$$C = B - A$$

$$BS = BD - C$$

$$TD = 2\sqrt{C(2BR - C)}$$

Figure 7:
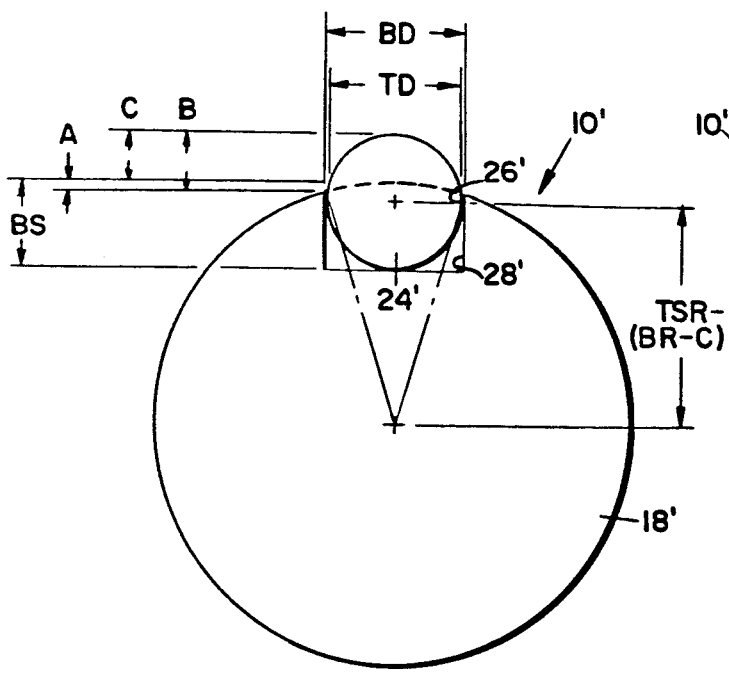
FIG. 7 is a graphic front elevational view similar to FIG. 5 showing a first modified form of spherical tooth pulley.
Figure 8:
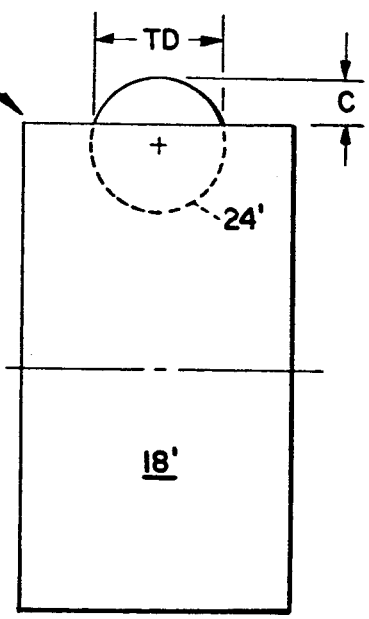
FIG. 8 is an end elevational view of the spherical tooth pulley of FIG. 7.

In FIGS. 7 and 8, the same legends and formulas are used in positioning a smaller ball 24' relative to a smaller annular opening 26' in an outer peripheral wall 18' and in a smaller rectangular opening 28' in a spherical tooth pulley 10'.

A wide variety of ball, pulley and belt dimensions and pulley profiles may be employed to adapt to any precision belt drive requirement.

Figure 9:
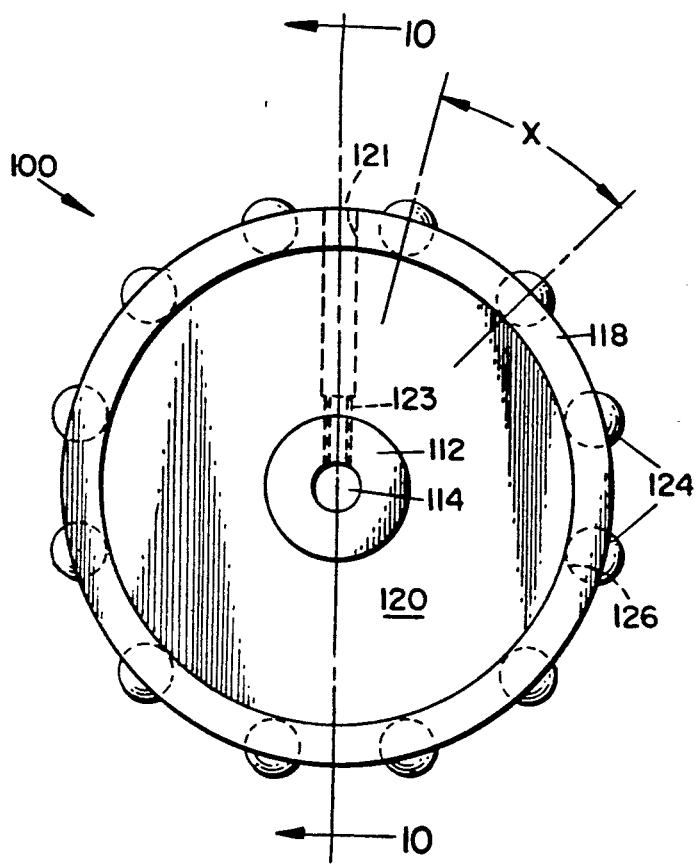
FIG. 9 is a front elevational view of a second modified form of spherical tooth pulley of the invention.
Figure 10:
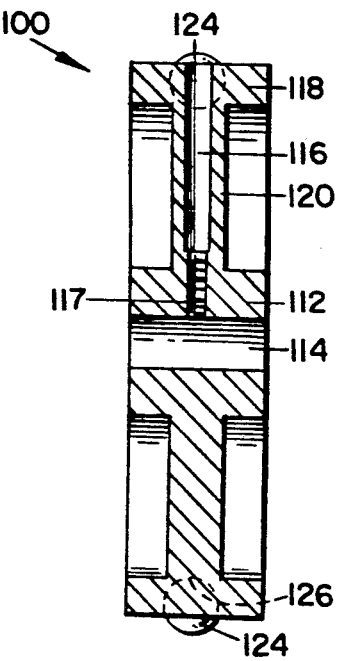
FIG. 10 is a cross-sectional view taken on line 10—10 of FIG. 9.

In FIGS. 9 and 10, a modified spherical tooth pulley 100 includes an inner ring-like hub 112 which surrounds an annular drive shaft opening 114 through which a drive shaft, not shown, may extend.

A ring-like outer peripheral wall 118 of the pulley is supported outwardly of hub 112 and in concentricity thereto by a web-like central wall segment 120 which extends between the hub and the outer peripheral wall.

A cylindrical opening 121 extends inwardly from outer peripheral wall 118 downwardly through central wall segment 120 and hub 112 and communicates with drive shaft opening 114, terminating at its inner end in a threaded portion 123 adapted to receive a set screw, not shown, for fixing the pulley to a drive shaft.

A plurality of spherical balls 124 are press fit into circumferentially-spaced annular openings 126 in outer peripheral wall 118.

Balls 124 may be fabricated from hardened steel, ceramic or thermoplastic such as ultra high molecular weight (UHMW) polypropylene or the like.

In this embodiment, twelve spherical balls 124 are provided at spaced intervals around the periphery of wall 118, being spaced apart a distance x representative of 30° increments to form rounded teeth which are engageable in openings of like spacing on a belt, not shown.

Figure 11:
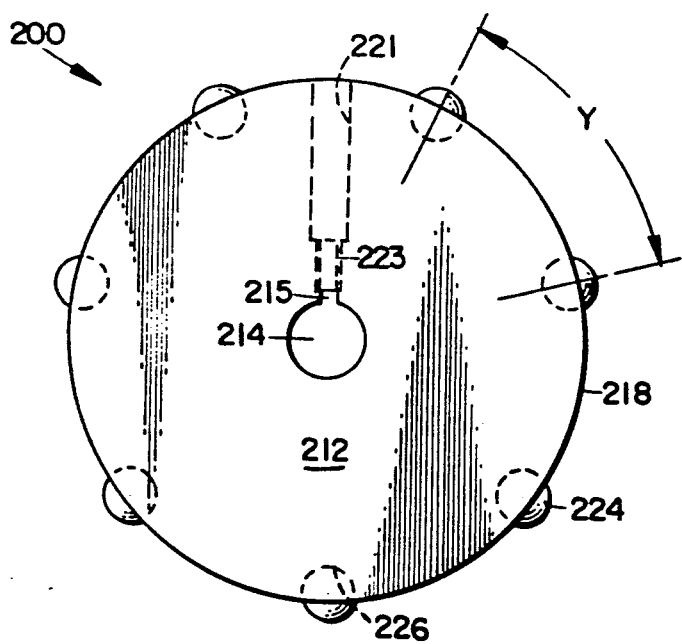
FIG. 11 is a front elevational view of a third modified form of spherical tooth pulley of the invention.
Figure 12:
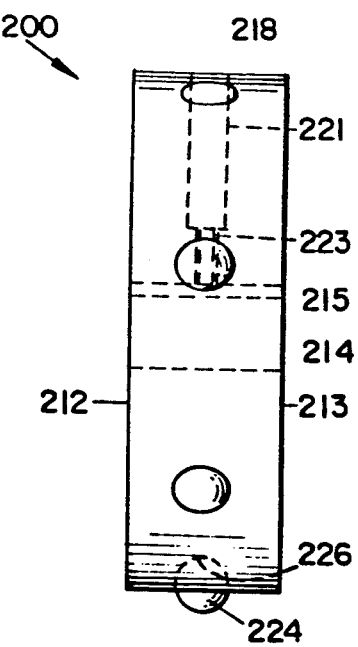
FIG. 12 is an end elevational view as seen from the right of FIG. 11.

In FIGS. 11 and 12, still another modified spherical tooth pulley 200 has flat front and rear faces 212 and 213 respectively and an annular outer peripheral face 218.

An annular drive shaft opening 214 extends centrally through the pulley and has a keyway 215 communicating therewith.

A cylindrical opening 221 extends inwardly from outer peripheral wall 218 downwardly through the pulley and communicates with keyway 215 of drive shaft opening 214, terminating at its inner end in a threaded portion 223 adapted to receive a set screw, not shown, for fixing the pulley to a drive shaft.

A plurality of spherical balls 224 are press fit into circumferentially-spaced annular openings 226 in outer peripheral face 218.

Balls 224 may be fabricated from hardened steel, ceramic or thermoplastic such as ultra high molecular weight (UHMW) polypropylene or the like.

In this embodiment seven spherical balls 224 are provided at spaced intervals around peripheral wall 218, being spaced apart, a distance Y representative of 51° 25' 43" increments to form rounded teeth which are engageable in openings of like spacing on a belt, not shown.

Figure 14:
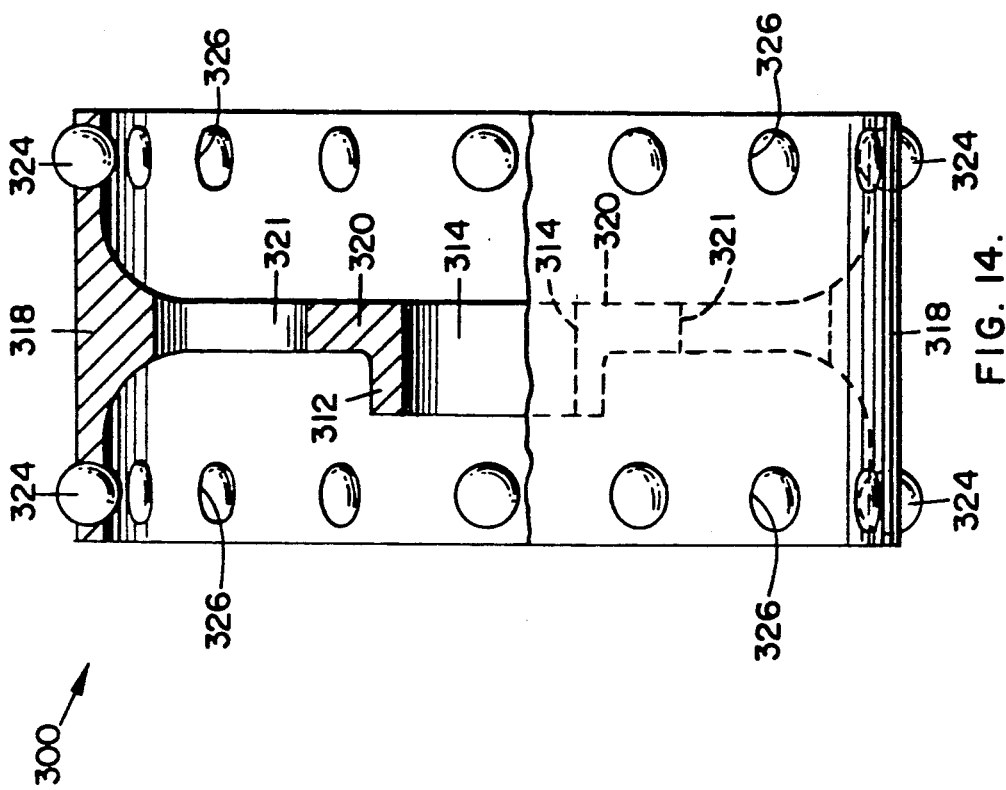
FIG. 14 is a part sectional view taken on line 14—14 of FIG. 13.
Figure 13:
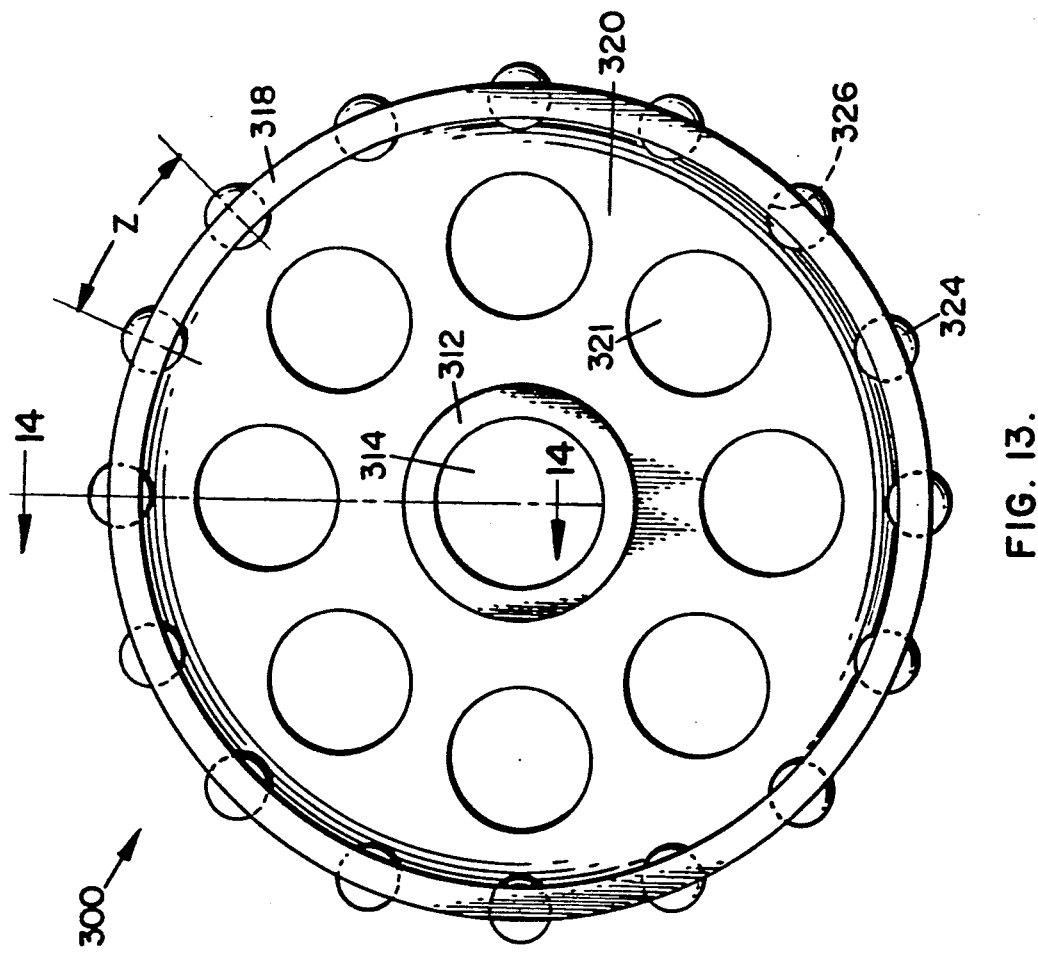
FIG. 13 is a front elevational view of a fourth modified form of spherical tooth pulley of the invention.

In FIGS. 13 and 14, still another modified spherical tooth pulley 300 includes an inner ring-like hub 312 which surrounds an annular drive shaft opening 314 through which a drive shaft, not shown, may extend.

A ring-like outer peripheral wall 318 of the pulley is supported outwardly of hub 312 and in concentricity thereto by a web-like central wall segment 320 which extends between the hub and the outer peripheral wall.

A plurality of circumferentially spaced annular openings 321 extend through central wall segment 320 to reduce the weight of the pulley.

Spaced rows of spherical balls 324 are press fit into circumferentially-spaced annular openings 326 in outer peripheral wall 318.

Balls 324 may be fabricated from hardened steel, ceramic or thermoplastic such as ultra high molecular weight (UHMW) polypropylene or the like.

In this embodiment, two rows of balls 324 are provided, each row containing sixteen balls disposed at spaced intervals around the periphery of wall 318. Herein the balls are spaced apart a distance Z representative of 22° 30' increments, to form rounded teeth which are engageable in rows of openings of like spacing on a belt, not shown.

It will be understood that any number of rows of balls may be provided in the pulley to interface with appropriately aligned rows of openings in the belt.

Figure 16:
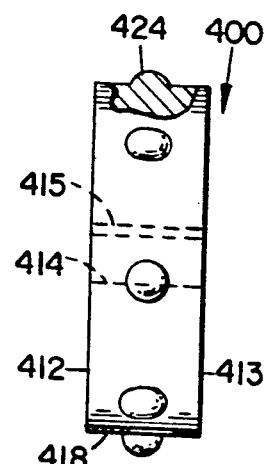
FIG. 16 is an end elevational view as seen from the right of FIG. 15.

In FIGS. 15 and 16, still another modified pulley 400 has flat front and rear faces 412 and 413 respectively and an annular outer peripheral face 418.

An annular drive shaft opening 414 extends centrally through the pulley and has a keyway 415 communicating therewith.

A plurality of circumferentially-spaced hemi-spherical protrusions 424 are formed integrally with the pulley and extend outwardly from outer peripheral face 418.

Hemi-spherical protrusions 424 form rounded teeth which are engageable in openings of like spacing on a belt, not shown.

We claim:

1. Motion transmitting mechanism including a pair of coacting driving and driven transmission members consisting of:

a first member in the form of an endless belt having a longitudinally-extending series of through openings at predetermined intervals therealong, a second member in the form of an annulus having an outer peripheral wall supported radially outwardly of a central hub by a plurality of spoke-like radially-arranged well-defining ribs, each well being radially aligned with and inwardly of a circular through opening in the outer peripheral wall, there being a series of the circular through openings continuously positioned in the circumferential direction at the corresponding predetermined intervals, the first member being trained on the second member, a plurality of spherical elements, each spherical element being disposed in the second member through one of the circular through openings and into its respective well and retained therein by a press fit in defining outwardly extending projections of hemispherical configuration, each projection being defined by a half sphere formed by the plane through the center of the spherical element extending radially outwardly from the periphery of the second member at the said predetermined intervals therearound for presenting a series of hemispherical teeth adapted to cooperate with and be engageable in the correspondingly spaced and shaped through openings of the first member in effecting a driving relationship between the first and second members.

* * * * *